United States Patent
Araki et al.

(10) Patent No.: US 10,490,997 B2
(45) Date of Patent: Nov. 26, 2019

(54) ELECTRONIC CONTROL DEVICE HAVING MULTIPLE SYSTEM CIRCUITS

(71) Applicant: Mitsubishi Electric Corporation, Tokyo (JP)

(72) Inventors: Rei Araki, Tokyo (JP); Yu Kawano, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 16/078,247

(22) PCT Filed: May 18, 2016

(86) PCT No.: PCT/JP2016/064682
§ 371 (c)(1),
(2) Date: Aug. 21, 2018

(87) PCT Pub. No.: WO2017/199357
PCT Pub. Date: Nov. 23, 2017

(65) Prior Publication Data
US 2019/0067933 A1    Feb. 28, 2019

(51) Int. Cl.
*H02P 27/06* (2006.01)
*H02H 7/08* (2006.01)
(Continued)

(52) U.S. Cl.
CPC .......... *H02H 7/0833* (2013.01); *H02H 7/08* (2013.01); *H02H 7/09* (2013.01); *H02H 7/26* (2013.01);
(Continued)

(58) Field of Classification Search
CPC ... B60L 3/0015; B60L 3/0023; B62D 5/0403; B62D 5/0487
See application file for complete search history.

(56) References Cited

U.S. PATENT DOCUMENTS 8,825,252 B2 * 9/2014 Sakata ............ B60L 3/0015
701/22
2007/0070326 A1 * 3/2007 Murata ............ G03G 15/50
355/407
(Continued)

FOREIGN PATENT DOCUMENTS

JP    63-211006 A    9/1988
JP    03-207264 A    9/1991
(Continued)

OTHER PUBLICATIONS

International Search Report for PCT/JP2016/064682, dated Aug. 16, 2016.
(Continued)

*Primary Examiner* — Rina I Duda
(74) *Attorney, Agent, or Firm* — Sughrue Mion, PLLC; Richard C. Turner

(57) ABSTRACT

An electronic control device having multiple system circuits is such that power supply interrupting means is provided independently in all the system circuits, an abnormal system circuit is interrupted using the interrupting means in accordance with an abnormality being detected, and control is continued using a normal system circuit, whereby redundancy is improved. A multiple of system circuits formed of a drive unit system circuit and a controller system circuit are divided from a branch point of a power line, and furthermore, a relay function of being capable of controlling so as to interrupt a power supply to each system circuit is disposed in each system circuit, whereby each system circuit can independently be shut off or continue to be operated.

9 Claims, 4 Drawing Sheets

(51) Int. Cl.
*H02M 7/48* (2007.01)
*H02H 7/09* (2006.01)
*H02P 29/024* (2016.01)
*H02H 7/26* (2006.01)
*H02H 7/28* (2006.01)

(52) U.S. Cl.
CPC ............... *H02H 7/28* (2013.01); *H02M 7/48* (2013.01); *H02P 27/06* (2013.01); *H02P 29/024* (2013.01); *H02P 29/0241* (2016.02)

(56) References Cited

U.S. PATENT DOCUMENTS

| | | | | |
|---|---|---|---|---|
| 2007/0145927 A1* | 6/2007 | Egami | .................. | B60L 3/0023 318/432 |
| 2011/0156623 A1* | 6/2011 | Nakamura | ............... | H02P 5/74 318/400.02 |
| 2011/0204839 A1* | 8/2011 | Mukai | .................. | B62D 5/0403 318/724 |
| 2013/0204477 A1* | 8/2013 | Sakata | .................. | B60L 3/0015 701/22 |
| 2013/0257328 A1 | 10/2013 | Arai et al. | | |
| 2013/0320905 A1* | 12/2013 | Uryu | .................... | B62D 5/0403 318/490 |
| 2017/0166248 A1 | 6/2017 | Asao et al. | | |

FOREIGN PATENT DOCUMENTS

| | | |
|---|---|---|
| JP | 2005-253156 A | 9/2005 |
| JP | 2010-041796 A | 2/2010 |
| JP | 2013-215040 A | 10/2013 |
| WO | 2016/063368 A | 4/2016 |

OTHER PUBLICATIONS

Communication dated Jul. 16, 2019, from the Japanese Patent Office in counterpart Application No. 2018-517988.

* cited by examiner

ELECTRONIC CONTROL DEVICE HAVING MULTIPLE SYSTEM CIRCUITS

This Application is a National Stage of International Application No. PCT/JP2016/064682 filed May 18, 2016.

TECHNICAL FIELD

The present invention relates to an electronic control device that has a multiple of independent system circuits, and which is provided with redundancy by switching to another system circuit, or continuing control using only a normal system circuit, when an abnormality occurs in a certain system circuit.

BACKGROUND ART

An electronic control device having at least two systems of drive unit (inverter unit) as a configuration having a redundant system, wherein a power supply relay that can interrupt a power supply is disposed on a power supply side of each system, and control is continued using only a normal side when an abnormality occurs in any one system, is already known as an existing electronic control device provided with redundancy (Patent Document 1).

CITATION LIST

Patent Literature

Patent Document 1: JP-A-2013-215040

SUMMARY OF INVENTION

Technical Problem

Technology introduced in the device disclosed in Patent Document 1 is such that multiple systems of drive unit (inverter unit) are independently included, a power supply relay is disposed between the power supply side of each system and the drive unit for electrically connecting or disconnecting the two, and, failure detecting means is further included for detecting an abnormality of the drive unit in each system. In Document 1, therefore, when a failure occurs in the drive unit (inverter unit) of any one of the multiple of systems, the power supply relay inserted in the system is shut off, whereby control is continued using only another system, and damage to a circuit element of the failed system due to induction voltage generated by a motor rotation is prevented by control means that controls the power supply relay to a regenerative energization state being included.

In Patent Document 1, however, although redundancy of the drive unit (inverter unit) is secured by a multiple of systems being independently included, control means that outputs an on/off command to the power supply relay, outputs a control command to the drive unit, or monitors an operating condition of the drive unit, simply exists independently in each system, and the control means are not provided with any redundancy. Consequently, redundancy is insufficient when considering the whole device.

The invention provides an electronic control device having multiple system circuits, wherein redundancy of the whole device, including an abnormality of control means, is secured.

Solution to Problem

An electronic control device having a multiple of system circuits divided from each other from a power line via a branch point is characterized in that the multiple of system circuits are configured of at least two drive unit system circuits, each of which supplies power from the power line to a load via a drive unit, and at least one controller system circuit that controls the drive unit from the power line via a controller, and the drive unit system circuit and the controller system circuit each include relay means that independently interrupts the power supply from the power line.

Advantageous Effects of Invention

The electronic control device having a multiple of system circuits of the invention has a multiple of system circuits formed of a drive unit system circuit and a controller system circuit, and furthermore, relay means that can control so as to interrupt a power supply to each system circuit is disposed in each system circuit, whereby each system circuit can independently be shut off or continue to be operated, and whichever system circuit an abnormality occurs in, operation can be continued using only a normal system circuit, and redundancy of the whole control device can be improved.

DESCRIPTION OF EMBODIMENTS

First Embodiment

Hereafter, based on the drawings, a first embodiment of the invention will be described.

Figure 1:
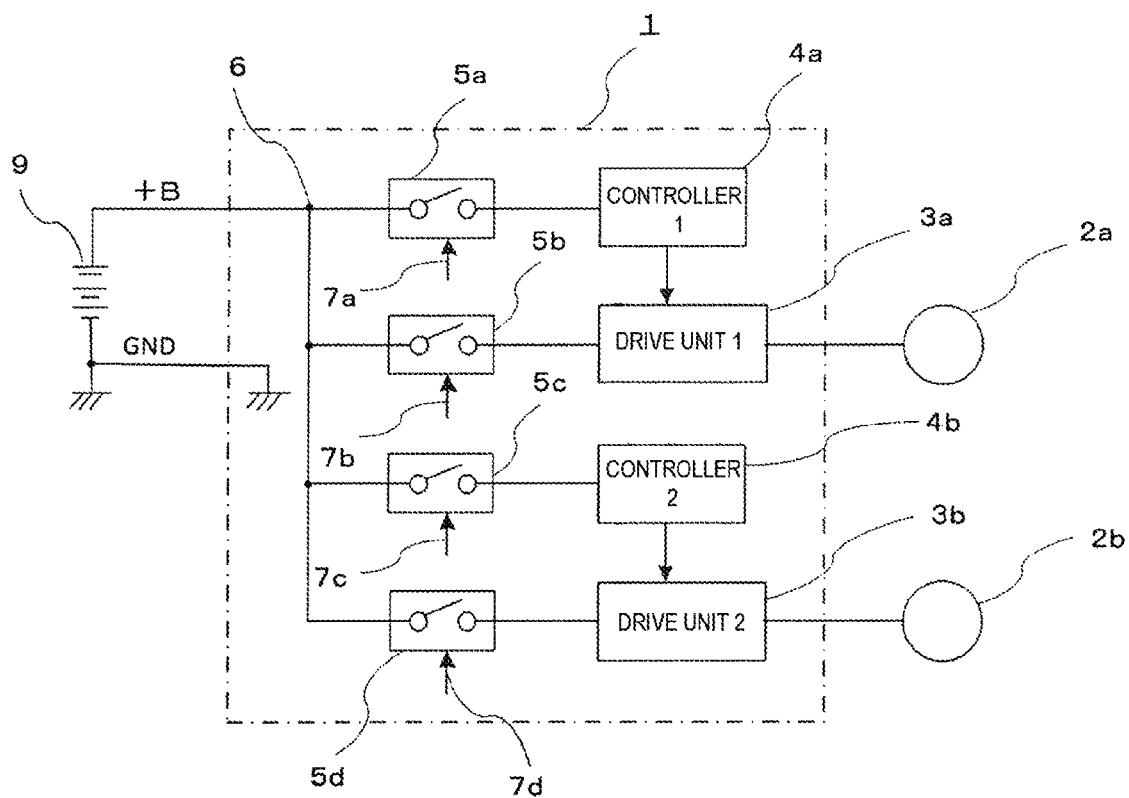
FIG. 1 is a circuit diagram showing an overall schematic configuration of an electronic control device having multiple system circuits in a first embodiment of the invention.

FIG. 1 is an overall schematic view of an electronic control device having multiple system circuits, which forms the invention. An electronic control device 1 has three or more system circuits that can be divided into functional blocks or circuit blocks. As one example, the electronic control device 1 will be described as an electronic control device including four independent system circuits in this embodiment.

As shown in FIG. 1, the electronic control device 1 is configured divided into four systems, those being systems of drive units 1 and 2 (3a and 3b) that drive actuators (motors) 2a and 2b, and systems of controllers 1 and 2 (4a and 4b) that compute a control amount with respect to the drive units, and output a command. A power supply voltage (+B) from a battery 9 and a ground (GND) are connected to the electronic control device 1. Furthermore, the power supply voltage +B is supplied divided to each system circuit from a branch point 6. Also, relay means 5a, 5b, 5c, and 5d are disposed one in each system so that when an abnormality occurs in one system circuit, other system circuits are unaffected.

Control signals 7a, 7b, 7c, and 7d that can supply and interrupt power are connected to the relay means 5a, 5b, 5c, and 5d respectively. A circuit network configured in this way is such that when a short-circuit fault such as an overcurrent flowing occurs in, for example, the controller 1 (4a), there is concern that the power supply voltage (+B) cannot be maintained, and there is a possibility of reaching a state wherein power cannot be normally supplied to another system either. Because of this, the relay means 5a is shut off by the control signal 7a when there is an abnormality. Herein, an output source of the control signals 7a, 7b, 7c, and 7d may be a controller or a drive unit farther to a downstream side than the relay means 5a, 5b, 5c, and 5d, or the control signals 7a, 7b, 7c, and 7d may be output by a separate circuit having an overcurrent detecting function, or the like, of being capable of detecting the short-circuit fault without using the controller or the drive unit.

Second Embodiment

Figure 2:
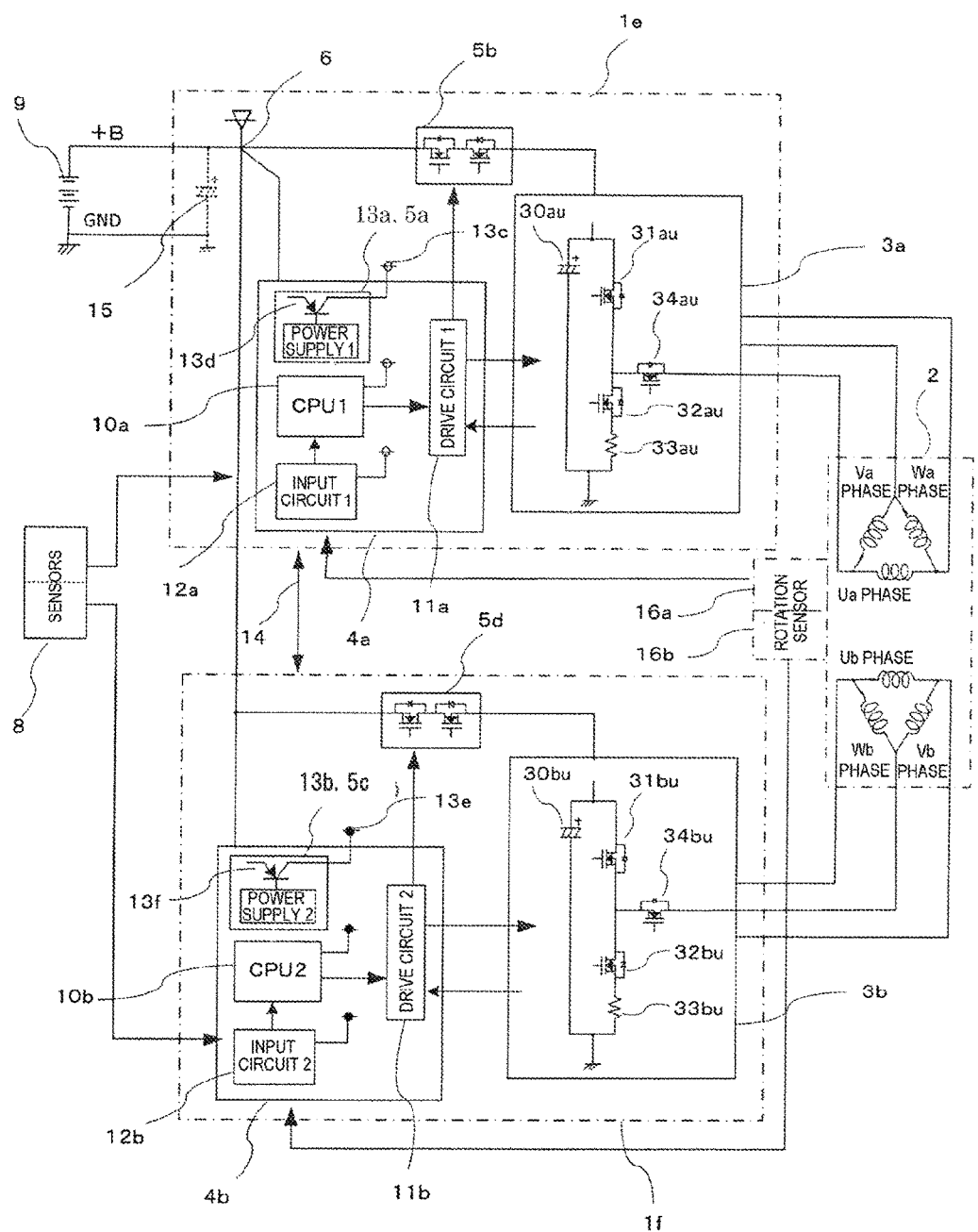
FIG. 2 is an overall circuit diagram of an electronic control device in a second embodiment of the invention.

FIG. 2 shows an overall circuit diagram wherein the schematic view of FIG. 1 is applied to a vehicle-use power steering device, and shows a modified example of FIG. 1 wherein controller relay means is also used as a partial switching element of a controller circuit.

FIG. 2 is broadly configured of a motor 2, control units 1e and 1f, sensor units 8, 16a, and 16b, and the battery 9.

Herein, the motor 2 is a three-phase brushless motor, and includes two systems of three-phase coil windings. Because of this, the control units 1e and 1f also include two systems, those being respectively inverter circuits 3a and 3b, corresponding to the drive units 1 and 2 (3a and 3b) of FIG. 1, and control circuits 4a and 4b, corresponding to the controllers 1 and 2 (4a and 4b) of FIG. 1. Because of this, the configuration is such that each of the two systems can independently supply power to the three-phase coil windings of the motor 2.

The battery 9, which is mounted in a vehicle, and the sensors 8, such as a vehicle speed sensor and a torque sensor that detects steering torque of a steering wheel, are installed in an exterior of the control units 1e and 1f, and rotation sensors 16a and 16b that detect a motor angle of rotation are disposed in a vicinity of the motor 2. The so-called inverter circuits 3a and 3b, wherein switching elements 31au, 32au, 31bu, and 32bu are connected to each phase on a high voltage side (hereafter, an upper arm) and a low voltage side (hereafter, a lower arm) in order to supply power to the motor 2, and furthermore, the power supply switching elements 5b and 5d, which have a relay function for carrying out a supply and interruption of power to the inverter circuits 3a and 3b, are disposed in the control units 1e and 1f.

Power from the battery 9 is divided from the branch point 6, and power supply circuits 13a and 13b that generate power supply voltage for causing each electronic part to operate, input circuits 12a and 12b for various kinds of information necessary for control from the sensors 8, the rotation sensors 16a and 16b, and the like, CPUs 1 and 2 (10a and 10b) that compute a control amount, and drive circuits 1 and 2 (11a and 11b) for driving the inverter circuits 3a and 3b based on a result of computation by the CPUs 1 and 2, are disposed in the control circuits 4a and 4b configuring the controllers.

As the control units 1e and 1f are formed of the same circuit network in this embodiment, only the control unit 1e will be described here.

An outline operation of the regions in the control unit 1e is such that on power being supplied from the battery 9 to the control unit 1e, voltage is supplied to the CPU 10a, the input circuit 12a, and the drive circuit 11a in the power supply circuit 13a, and to the rotation sensor 16a and the like, so as to cause those regions to operate normally. Also, power for the inverter circuit 3a is also supplied from the battery 9.

Information from the sensors 8, such as the vehicle speed sensor and the torque sensor, is sent via the input circuit 12a to the CPU 10a, and the CPU 10a computes an amount of control supplying power to the motor 2 based on these items of information. A command based on a result of the computation is transmitted from the CPU 10a to the drive circuit 11a, and the drive circuit 11a outputs a signal for driving the inverter circuit 3a.

Also, voltage or current of each portion in the inverter circuit 3a is detected, and the detected voltage or current is transmitted to the CPU 10a via, for example, the input circuit 12a. When carrying out a so-called sensorless control, or the like, such that control is carried out without detecting voltage, current, or the like in the inverter circuit 3a, the voltage or current of each portion in the inverter circuit 3a need not necessarily be transmitted to the CPU 10a.

The power supply switching element 5b having the relay function of being capable of supplying and interrupting power is disposed in a +B power line to the inverter circuit 3a. The power supply switching element 5b is, for example, a MOSFET.

In this example, MOSFETs are inserted in series so that parasitic diodes of the MOSFETs are disposed in a forward direction and a reverse direction of a current supply, with an object of providing both the function of supplying and interrupting power and a function of protecting the inverter circuit 3a when, for example, the +B and the GND of the battery are connected in reverse.

The power supply can be forcibly interrupted by the power supply switching element 5b when a failure occurs in the inverter circuit 3a or the motor 2, or the like. Drive of the power supply switching element 5b is controlled by the CPU 10a via the drive circuit 11a. However, the power supply switching element 5b may also be driven by a circuit independent of the CPU 10a and the drive circuit 11a.

In order to supply desired power to the three-phase windings (a U-phase, a V-phase, and a W-phase) of the motor 2, the inverter circuit 3a is configured of the switching elements 31au and 32au, a shunt resistor 33au, a smoothing capacitor 30au, and the like, disposed in the upper arm and the lower arm of each phase. As the V-phase and the W-phase are of the same circuit configuration, the V-phase and the W-phase are omitted from the drawing, and the following description will be of the U-phase only.

The U-phase includes the two switching elements (31au and 32au) configuring the upper and lower arms in series, and a motor relay switching element 34au having a relay function of being capable of turning a power supply between the motor windings and the switching elements (31au and 32au) on and off. The upper and lower arm switching elements 31au and 32au are driven via the drive circuit 11a based on a result of a control amount computation by the CPU 10a.

The smoothing capacitor 30au is also connected in a vicinity of the switching elements 31au and 32au, with an object of restricting power supply voltage fluctuation and noise when switching.

Furthermore, the shunt resistor 33au is also connected, in order to detect current flowing into the motor 2. Voltage between the upper and lower arm switching elements 31au and 32au, or voltage of a motor winding terminal, and voltage across the shunt resistor 33au are transmitted to the CPU 10a, differences between control command values (target values) of the CPU 10a and actual current and voltage values are ascertained, and a so-called feedback control for causing the motor to rotate is carried out. Furthermore, failure determination for each portion is also carried out.

Also, by the angle of rotation being detected by the rotation sensor 16a, the CPU 10a calculates a rotation position or a rotation speed of the motor, and utilizes this in computing control for causing the motor to rotate.

A correspondence to each region of FIG. 1 in FIG. 2 will be described. The branch point 6 of the power supply line is shown with the same reference sign. The relay means 5a and 5c of FIG. 1 correspond to the power supply circuits 13a and 13b of FIG. 2, and the relay means 5b and 5d of FIG. 1 correspond to the power supply switching elements 5b and 5d of FIG. 2. The controllers 4a and 4b of FIG. 1 correspond to the control circuits 4a and 4b of FIG. 2, and the drive units 3a and 3b correspond to the inverter circuits 3a and 3b.

In FIG. 2, the control circuits 4a and 4b include the power supply circuits 1 and 2 (13a and 13b). The control circuits 4a and 4b may also have the relay means 5a and 5c farther to an upstream side (battery side) than the power supply circuits 1 and 2 (13a and 13b), as described in the first embodiment of FIG. 1.

In the event that an abnormality such as a ground fault to the GND occurs farther to the downstream side (load side) than the relay means 5a and 5c, the relay means 5a and 5c are shut off by a circuit that can detect a ground fault, such as an overcurrent detecting circuit, and the ground fault that has occurred can be prevented from affecting another system.

For example, when a ground fault occurs on a downstream side of the power supply 1 of the control circuit 4a, an overcurrent will prevent the power supply voltage (+B) from being maintained unless the relay means 5a is shut off, and continued operation of the control circuit 4b and the inverter circuit 3b will also become difficult, but by the relay means 5a being shut off, an effect on the control circuit 4b and the inverter circuit 3b is eliminated, and continued operation of the whole device can be enabled.

In FIG. 2, the relay means 5a and 5c can be included in functions of the power supply circuits 1 and 2 (13a and 13b), rather than being circuits independent as the relay means 5a and 5c, as is the case in FIG. 1. For example, when step-down chopper circuits or LDO (low dropout) regulators are applied to the power supply circuits 1 and 2 (13a and 13b), these circuits generally have switching elements 13d and 13f, such as bipolar transistors or MOSFETs, in series with the power supply line, because of which, when an abnormality such as a ground fault occurs on a downstream side of the power supply circuits 1 and 2 (13a and 13b), the same function as that of the relay means 5a and 5c can be achieved by adopting a circuit configuration that shuts off the switching elements 13d and 13f included in the step-down chopper circuits or the LDO regulators.

Figure 3:
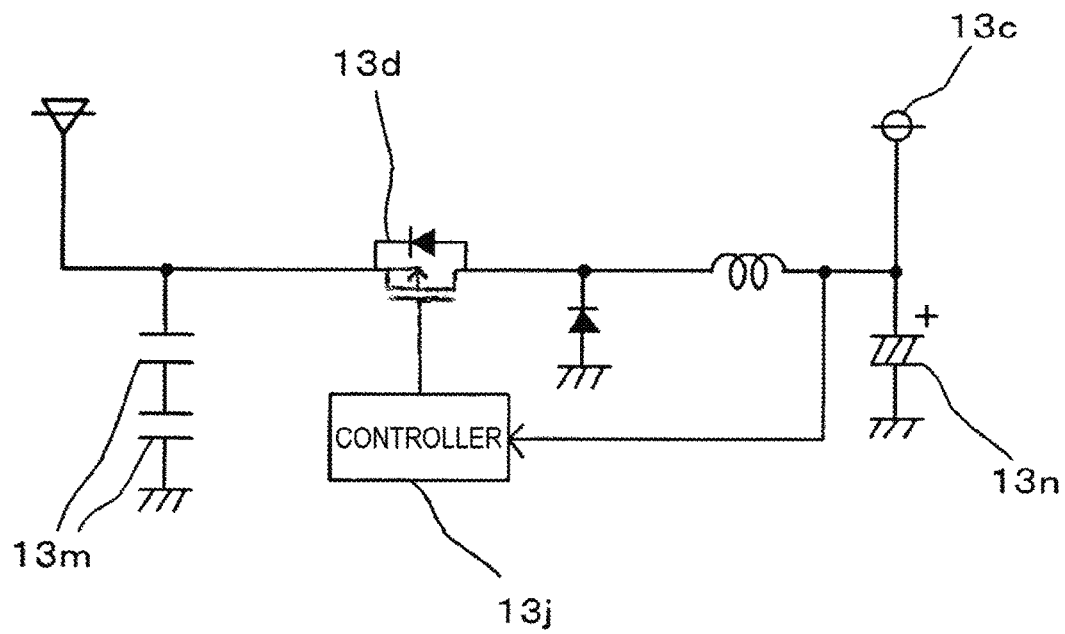
FIG. 3 is one example of a power supply circuit used in the electronic control device in the second embodiment of the invention.

FIG. 3 is a specific circuit diagram of a case wherein step-down chopper circuits are applied to the power supply circuits 1 and 2 (13a and 13b), and this example is such that when an abnormality such as a ground fault or an overcurrent occurs on the downstream side of the power supply circuits 1 and 2 (13a and 13b), the abnormality is detected in a controller 13j, which governs feedback control of the step-down chopper circuit, and by the switching element 13d being held in a shut-off state, the switching element 13d, which is used in a power chopping application of the step-down chopper circuit at a time of normal operation, can also be used as relay means. The same also applies to the kind of LDO regulator circuit shown in a power supply circuit 19 in FIG. 5, to be described hereafter. That is, there is no need for the relay means 5a and 5c to be disposed independently, and the switching elements configuring the controllers can also be used as the relay means, because of which a reduction in size of the electronic control device can be achieved.

The CPUs 10a and 10b of FIG. 2 can ascertain each other's operating condition with respect to computation details of the other CPU, for example, information input from the sensors or the like, details of an abnormality detected in the system, or a control amount, via a communication line 14. Because of this, each CPU can recognize the existence or otherwise of an abnormality in the system of the other CPU, and can also control so as to vary the control amount of the CPU itself when, for example, there is an abnormality in the system of the other CPU.

In the same way, the inverter circuits 3a and 3b corresponding to the drive units can detect an abnormality or the like of each switching element in the inverter circuits 3a and 3b, and furthermore, in the coil windings of the motor 2, by voltage, current, or the like, differing from a control command being monitored by the CPUs 10a and 10b. For example, when an abnormality on the inverter circuit 3a side is detected, the CPU 10a outputs a control command so as to shut off the power supply switching element 5b, which is relay means, when the abnormality affects the inverter circuit 3b side. The power supply switching element 5b is turned off by the command, whereby the power supply to the motor 2 is interrupted.

Depending on the detected abnormality, there are also cases in which the power supply switching element 5b need not be shut off. For example, in a case of an open failure of the switching elements 31au and 32au, which are the upper and lower arms, or a short-circuit fault of the motor relay switching element 34au, drive can also be continued using the remaining two normal phases provided that the switching elements of the other phases are normal, because of which the power supply switching element 5b is not shut off.

Although the controller system relay means 5a and 5c and the drive unit system relay means 5b and 5d are each of practically identical circuit configurations, the output sources of the control signals 7a, 7b, 7c, and 7d differ.

The relay means 5a and 5c are disposed on the upstream sides of the power supply circuits 13a and 13b, as previously mentioned, or the functions of the relay means 5a and 5c are included in the power supply circuits 13a and 13b, as previously described. Meanwhile, voltage generated in the power supply circuits 13a and 13b is also supplied to the CPUs 10a and 10b.

Although it is when an abnormality occurs on the downstream side of the power supply circuits 13a and 13b that the relay means 5a and 5c are shut off, there is concern in this case that the effect of the abnormality is extending to some abnormality also occurring in the CPUs 10a and 10b, and there is a possibility that the relay means 5a and 5c cannot be controlled normally. Because of this, control (the control signals 7a and 7c) of the relay means 5a and 5c is carried out by a separate circuit (for example, the overcurrent detecting circuit) rather than by the CPUs 10a and 10b.

Meanwhile, the power supply switching elements 5b and 5d are controlled via the drive circuits 11a and 11b based on a result of a determination by the CPUs 10a and 10b.

As heretofore described, the output sources of the relay means control signals are caused to differ in accordance with a place of disposition.

A capacitor 13*m* of FIG. 3 is disposed with an object of restricting an effect of fluctuation in an input voltage of the step-down chopper circuit corresponding to the power supply circuit 13*a*, and an object of restricting noise.

Meanwhile, a capacitor 13*n* is disposed with an object of smoothing an output voltage of the step-down chopper circuit corresponding to the power supply circuit 13*a*. For example, the capacitor 13*m* is a ceramic capacitor, and 13*n* is an electrolytic capacitor. When a multilayer ceramic capacitor, particularly a surface-mounted type of chip capacitor, is used for the capacitor 13*m*, there is a possibility of a short-circuit fault as a failure mode thereof, and the power supply line is grounded in the event of a failure occurring. In this case, another system circuit, such as the power supply circuit 13*b*, becomes incapable of continuing normal operation due to an effect of the ground fault. Because of this, a multiple (two in FIG. 3) of the capacitor 13*m* are connected in series, thereby reducing a ground fault occurrence rate.

Meanwhile, in an electrolytic capacitor, the possibility of a short-circuit fault occurring as a failure mode is extremely low, and a ground fault occurrence rate can be sufficiently reduced without a multiple of electrolytic capacitors being connected in series. Because of this, only one of the capacitor 13*n* in FIG. 2 is used, as these are electrolytic capacitors, and a method of use is changed with consideration to a failure mode and a failure occurrence rate, as previously described.

As heretofore described, the electronic control device having multiple system circuits, which forms the invention, is configured of at least two drive unit system circuits, each of which supplies power from a power line to a load via a drive unit, and at least one controller system circuit that controls the drive unit from the power line via a controller, and includes relay means that interrupts the power supply from the power line independently in each of the drive unit system circuit and the controller system circuit.

Because of this, by having means that interrupts the power supply to the drive unit and means that interrupts the power supply to the controller, an abnormality in one portion can be prevented from affecting another normal region, and redundancy of the whole circuit can be improved.

Further, control as a device can be continued even when an abnormality occurs in a system circuit in one portion, it does not happen that a function suddenly ceases to act due to an abnormality while a vehicle is being driven, and safety of the vehicle can be secured.

Furthermore, the configuration is such that the output sources of the control signals 7*a*, 7*b*, 7*c*, and 7*d* that shut off the relay means change in accordance with a place of disposition, the controller relay means, rather than being controlled by, for example, a CPU of the controller, is controlled by a separate circuit without using the CPU, while the drive unit relay means may be controlled by, for example, the CPU of the controller, because of which double redundancy can be secured.

Third Embodiment

Figure 4:
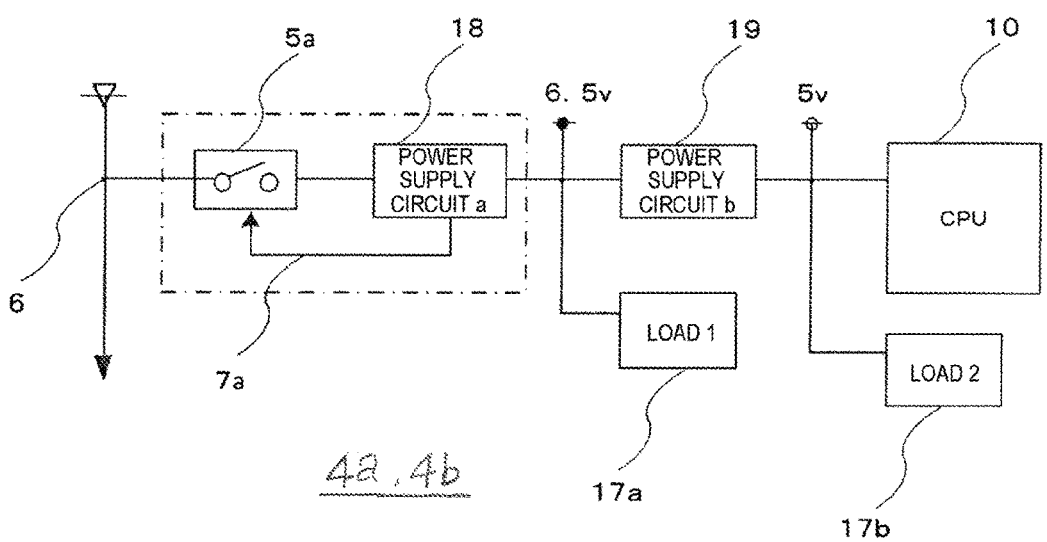
FIG. 4 is a schematic view showing another configuration of a controller as a third embodiment of the invention.

In the second embodiment, the simplest circuit example is shown for the power supply circuits 13*a* and 13*b* in the two controllers 4*a* and 4*b*, but in actuality, it is often the case that a multiple of power supply circuits are connected in series, thereby responding to loads that need various kinds of power supply voltage. FIG. 4 is a schematic circuit configuration diagram of the controllers 4*a* and 4*b* showing one example of this, and in the diagram, the relay means 5*a* is disposed in a position farthest upstream of the power line, and two constant voltage circuits, those being a first power supply circuit 18 and a second power supply circuit 19, are connected in series in a subsequent stage.

Power is supplied to the controller 4*a* from the branch point 6 of a main power supply, and firstly, a first constant voltage (for example, 6.5V) is output by the relay means 5*a* and the first power supply circuit 18. Next, using this constant voltage output, a constant voltage (for example, 5V) is output in the second power supply circuit 19. Also, the output voltage of the first power supply circuit 18 is supplied to, for example, a load 1 (17*a*) of a sensor power supply. The second power supply circuit 19 further supplies power to, for example, a CPU 10 and a load 2 (17*b*). The control signal 7*a* of the relay means 5*a* is controlled by, for example, the first power supply circuit 18.

By power supply circuits being connected in series in this way, the whole of the controller circuit can be protected by at least one relay means 5*a* being disposed only in a position farthest upstream of the power supply circuits, because of which the circuit configuration is simplified.

Figure 5:
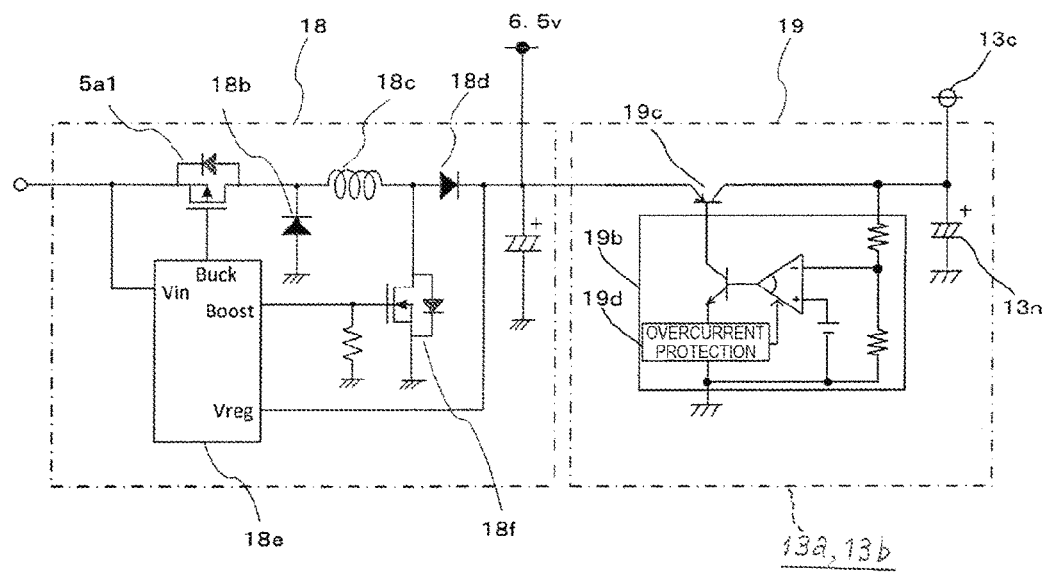
FIG. 5 is a specific circuit configuration diagram of a power supply circuit of FIG. 4

FIG. 5 is a specific circuit configuration diagram of the two power supply circuits 18 and 19, that is, the two constant voltage output circuit portions, in FIG. 4. The power supply circuit 18 includes the relay means 5*a* and the first power supply circuit 18 of FIG. 4. A switching element 5*a*1 corresponds to the relay means 5*a*, and a controller unit 18*e* has both step-down and step-up functions. A step-down chopper circuit is configured of the switching element 5*a*1, a diode 18*b*, and an inductor 18*c*, and a step-up chopper circuit is configured of the inductor 18*c*, a switching element 18*f*, and a diode 18*d*.

In the circuit example of FIG. 5, the switching element 5*a*1 is controlled so as to operate as a step-down regulator by a signal output from a buck terminal of the controller unit 18*e*, and the switching element 18*f* is controlled so as to operate as a step-up regulator by a signal output from a boost terminal of the controller unit 18*e*.

That is, when 12V is supplied as battery voltage to the branch point 6 of FIG. 4, 6.5V is output by the step-down regulator, but when the battery voltage decreases to the vicinity of, for example, 6 to 7V, an output of 6.5V is difficult to maintain when considering a voltage decrease in each part. When this kind of battery voltage decrease occurs, the step-up regulator function operates, and an output of 6.5V can be maintained.

In the example of FIG. 5, Vin of the controller unit 18*e* is a power supply terminal, while Vreg is a terminal that monitors output voltage (6.5V) in order to carry out feedback control of the step-down chopper circuit and the step-up chopper circuit, and is controlled so that the voltage is always a constant voltage.

It should be noted that the step-down chopper circuit is always disposed farther to the upstream side (battery side) than the step-up chopper circuit, as shown in the example of FIG. 5. This is because although the switching element 5*a*1 is disposed in series with the power line in the step-down chopper circuit, the switching element 18*f* is not disposed in series with the power line in the step-up chopper circuit, and the relay means function cannot be executed in the step-up chopper circuit.

When attempting to employ a circuit configuration wherein, for example, a step-down chopper circuit and a step-up chopper circuit are mixed in series, as previously described, when the relay means 5*a* is disposed in a position farthest upstream farther to the downstream side (load side) than the branch point 6 of the power line, as in FIG. 4, the relay means can be provided farther to the upstream side by the step-down chopper circuit being disposed on the upstream side. However, when the relay means 5a is provided in a position farther upstream, independent of the power supply circuit 18, the step-up chopper circuit may be disposed farther to the upstream side than the step-down chopper circuit, even when, for example, the power supply circuit 18 includes both the step-down chopper circuit and the step-up chopper circuit.

The power supply circuit 19 is, for example, an LDO regulator circuit, and is a publicly-known constant voltage output circuit configured of an output transistor 19c for controlling output voltage to 5V, and a control circuit 19b that controls the output transistor. Herein, an example wherein an overcurrent protection circuit 19d is inserted is shown, and a configuration is such that when an overcurrent occurs, the overcurrent is detected, and the output transistor 19c is shut off. In the event that an abnormality such as a ground fault occurs farther to the downstream side (load side) than the power supply circuit 19, the output transistor 19c is shut off by the overcurrent protection circuit 19d, whereby a function equivalent to that of relay means can also be added to the power supply circuit 19.

When two constant power supply circuits are connected in series in this way, two relay means can be connected in series (5a1 and 19c) using the switching element included in each power supply circuit, and furthermore, the ground fault occurrence rate can easily be reduced.

Also, rather than control signals of the relay means each being controlled by a determination of a downstream CPU, means that monitors each output voltage, and stops the voltage output by shutting off the relay means when an abnormality occurs, is incorporated, and can operate independently of the CPU.

As heretofore described, relay means can be included in a power supply circuit, relay means can also be interposed in each power supply circuit, and furthermore, by interposing at least one relay means farther upstream and carrying out power supply interruption when an abnormality occurs in a downstream circuit, a configuration can be such that a circuit other than the circuit in which the abnormality occurs is unaffected.

REFERENCE SIGNS LIST

1 Electronic control device, 1e, 1f Control unit, 2 Motor, 3a, 3b Inverter circuit (drive unit), 4a, 4b Control circuit (controller), 5a, 5b, 5c, 5d Relay means, 5a1 Switching element, 6 Branch point, 7a, 7b, 7c, 7d Control signal, 8 Sensors, 9 Battery, 10a, 10b CPU, 11a, 11b Drive circuit, 12a, 12b Input circuit, 13a, 13b Power supply circuit, 13c, 13e Control circuit power supply, 13d, 13f Power supply circuit switching element, 13j Controller, 13m Input capacitor, 13n Output capacitor, 14 Communication line, 15 Capacitor, 16a, 16b Rotation sensor, 17a, 17b Load, 18, 18a, 19, 19a Power supply circuit, 18b, 18d Diode, 18c Coil, 18e Controller unit, 18f Switching element, 19b LDO control circuit, 19c Output transistor, 19d LDO overcurrent protection circuit, 30au, 30bu Smoothing capacitor, 31au, 31bu Upper arm, 32au, 32bu Lower arm, 33au, 33bu Shunt resistor, 34au, 34bu Motor relay

The invention claimed is:

1. An electronic control device having multiple system circuits, being connected to a battery and divided from each other from a power line of the battery via a branch point, wherein the multiple of system circuits are configured of a first drive unit system circuit, a second drive unit system circuit, a first controller system circuit, and a second controller system circuit, each of the first and the second drive unit system circuits comprises a drive unit which supplies power from the power line to a load, each of the first and the second controller system circuits comprises a central processing unit (CPU) which controls the corresponding drive unit, and each of the first and the second drive units and the first and the second controller system circuits includes a relay that independently interrupts the power supply from the power line.

2. The electronic control device having multiple system circuits according to claim 1, wherein the relay disposed in each of the first and the second drive unit system circuits and the first and the second controller system circuit independently have a control signal for turning the relay on and off, and an output source of the control signal differs in accordance with the system circuit.

3. The electronic control device having multiple system circuits according to claim 1, wherein the control signal of the relay of the first drive unit is output via the CPU of the first controller system circuit, and the control signal of the second drive unit is output via the CPU of the second controller system circuit.

4. The electronic control device having multiple system circuits according to claim 1, wherein the control signal of the relay of the first controller system circuit is output from a hardware component other than the CPU of the first controller system circuit, and the control signal of the relay of the second controller system circuit is output from another hardware component other than the CPU of the second controller system circuit.

5. The electronic control device having multiple system circuits according to claim 2, wherein each of the first and the second controller system circuit includes a power supply circuit formed of a switching element inserted in series with the power line, and the switching element of the power supply circuit is used as the relay.

6. The electronic control device having multiple system circuits according to claim 3, wherein each of the first and the second controller system circuits includes a power supply circuit formed of a switching element inserted in series with the power line, and the switching element of the power supply circuit is used as the relay.

7. The electronic control device having multiple system circuits according to claim 4, wherein each of the first and the second controller system circuits includes a power supply circuit formed of a switching element inserted in series with the power line, and the switching element of the power supply circuit is used as the relay.

8. The electronic control device having multiple system circuits according to claim 1, including at least two capacitors connected in series between the power line and a ground on an input side of the power supply circuit.

9. The electronic control device having multiple system circuits according to claim 1, wherein the controller is formed of a multiple of power supply circuits connected to each other in series, and relay that interrupts the power supply from the power line is inserted in at least the power supply circuit nearest to a power supply of the multiple of power supply circuits.

* * * * *